(12) United States Patent
Savicki, Jr. et al.

(10) Patent No.: US 7,041,902 B1
(45) Date of Patent: May 9, 2006

(54) MODULAR ELECTRICAL DEVICE WITH CIRCUIT SPLITTING MEMBER

(75) Inventors: Gerald R. Savicki, Jr., Syracuse, NY (US); Dejan Radosavljevic, LaFayette, NY (US); Kenneth Vought, Tully, NY (US)

(73) Assignee: Pass & Seymour, Inc., Sgracuse, NY (US)

( * ) Notice: Subject to any disclaimer, the term of this patent is extended or adjusted under 35 U.S.C. 154(b) by 249 days.

(21) Appl. No.: 10/729,566

(22) Filed: Dec. 5, 2003

Related U.S. Application Data

(60) Provisional application No. 60/439,370, filed on Jan. 9, 2003.

(51) Int. Cl.
  *H02G 3/18* (2006.01)

(52) U.S. Cl. .................. 174/59; 174/53; 174/58; 200/297; 439/535

(58) Field of Classification Search .............. 174/50, 174/53, 58, 57, 59, 48, 49; 220/3.2, 3.3, 220/3.4, 3.5, 3.6, 3.8, 4.02; 439/180, 535, 439/45, 46, 49, 507, 510, 650, 538, 231; 200/296, 297, 293, 294, 303, 309
See application file for complete search history.

(56) References Cited

U.S. PATENT DOCUMENTS

| | | | |
|---|---|---|---|
| 3,694,790 A * | 9/1972 | Martin | 439/538 |
| 3,812,445 A * | 5/1974 | Stefani | 439/650 |
| 3,967,873 A * | 7/1976 | Schumacher | 439/650 |
| 6,322,381 B1 * | 11/2001 | Evanisko | 439/231 |
| 6,657,144 B1 * | 12/2003 | Savicki et al. | 174/53 |

\* cited by examiner

*Primary Examiner*—Angel R. Estrada
(74) *Attorney, Agent, or Firm*—Daniel P. Malley; Bond, Schoeneck & King, PLLC

(57) ABSTRACT

An electrical wiring device including a housing. The electrical wiring device further includes a first electrical device disposed within the housing. The first electrical device includes a plurality of terminals. The electrical wiring device further includes a second electrical device disposed within the housing. The second electrical switch includes a second plurality of terminals. The electrical wiring device further includes a insertable member or element coupled to at least one of the first plurality of terminals and at least one of the second plurality of terminals, thereby establishing electrical conductivity between the first and second electrical devices.

41 Claims, 6 Drawing Sheets

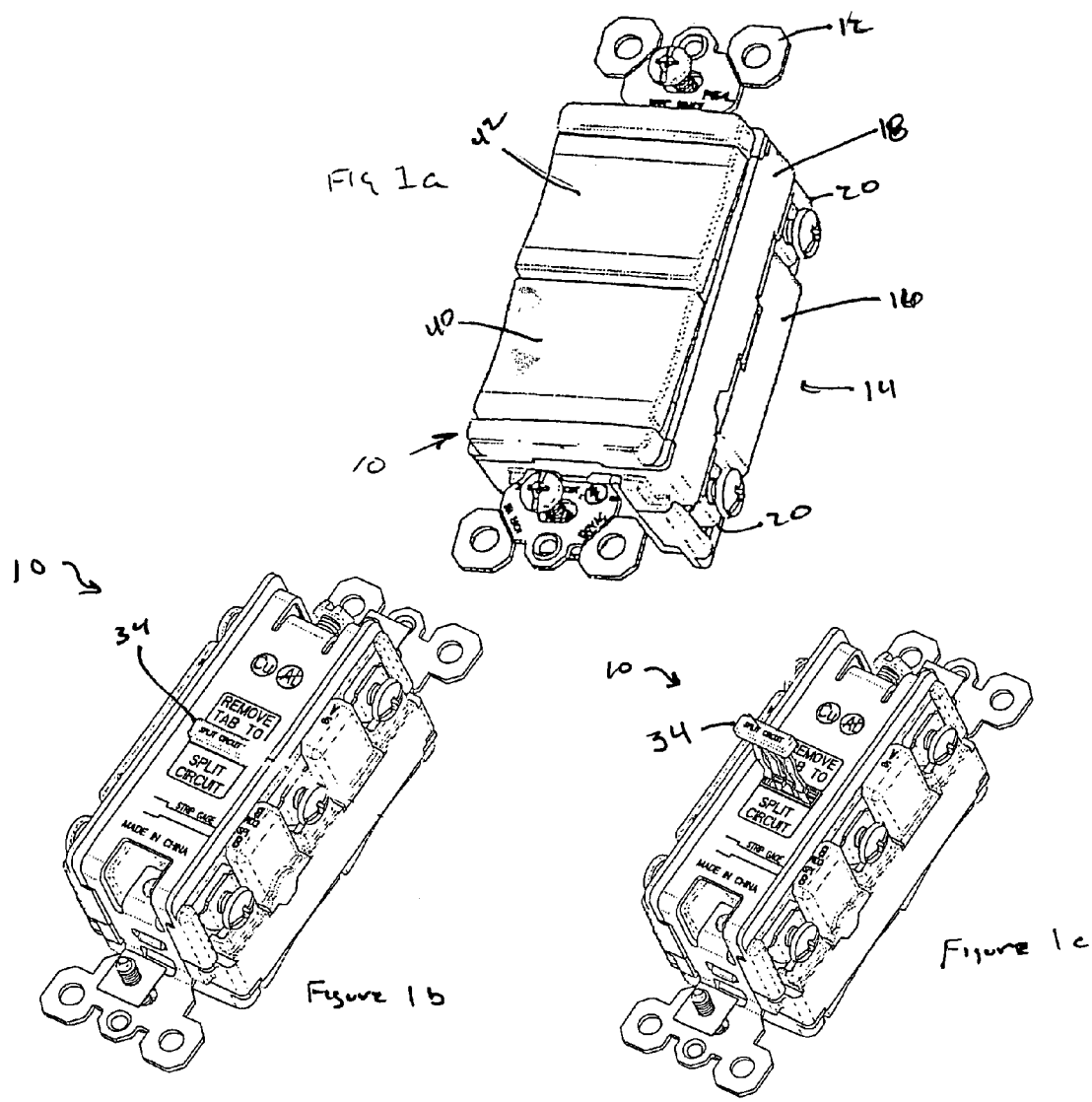

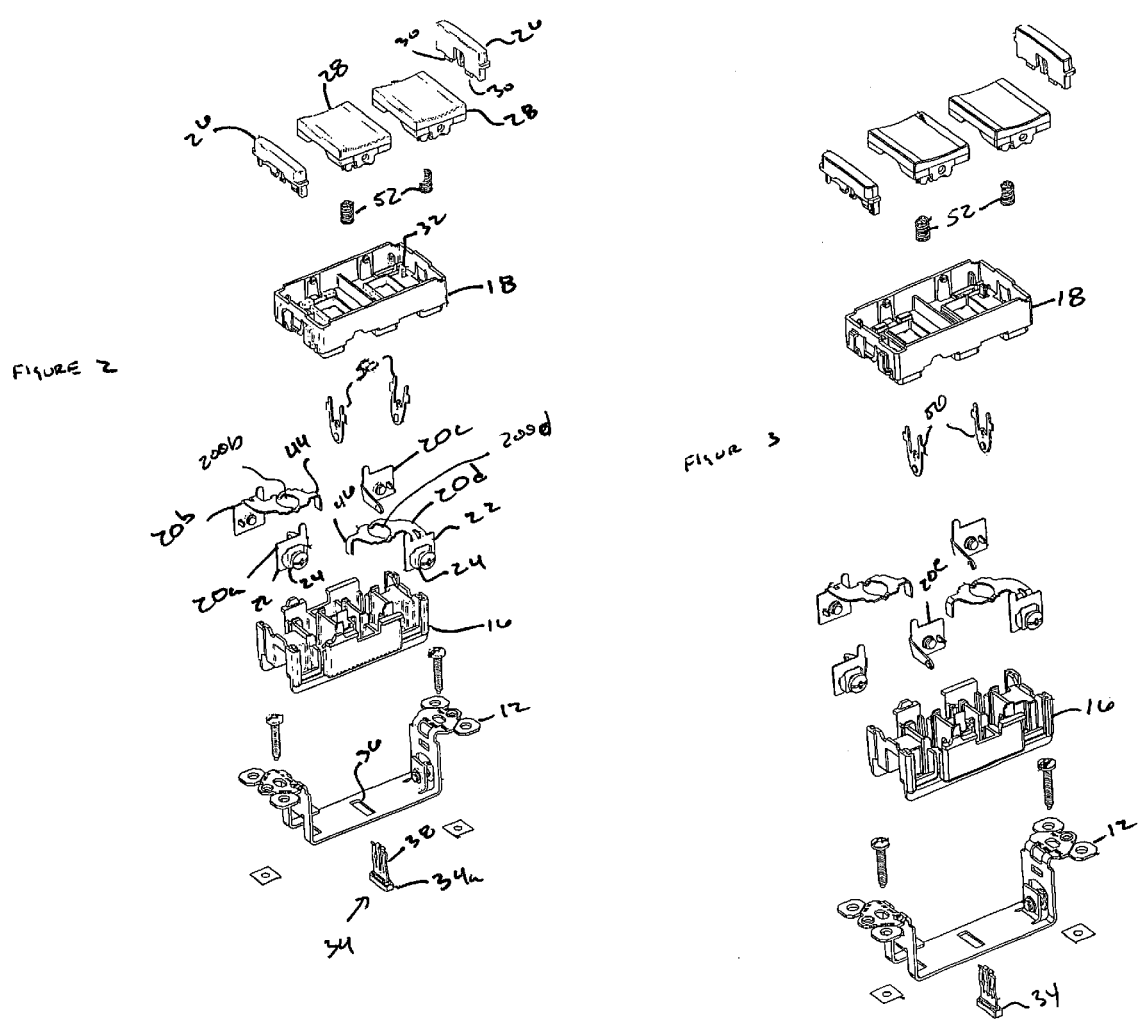

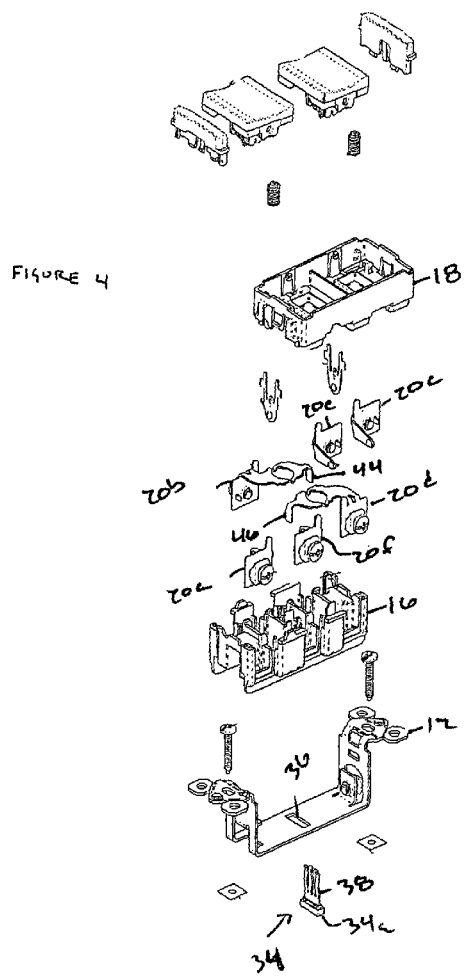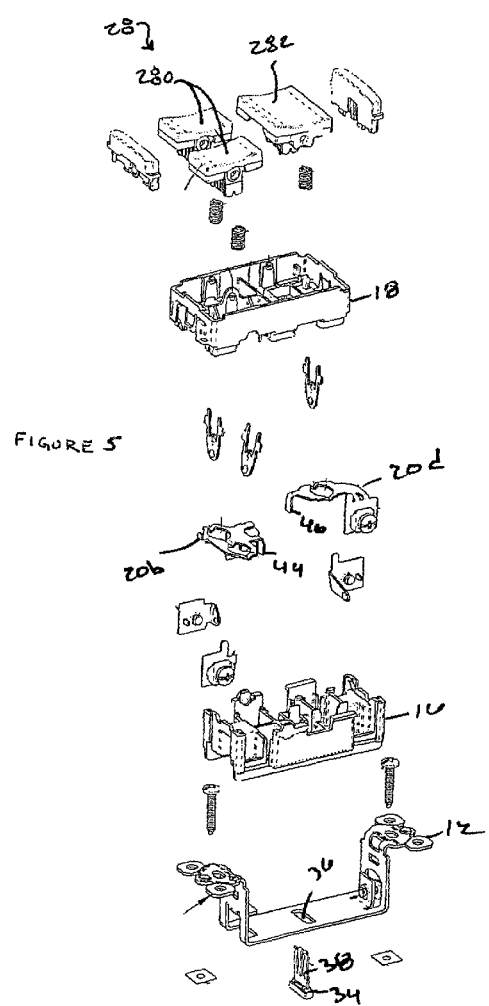

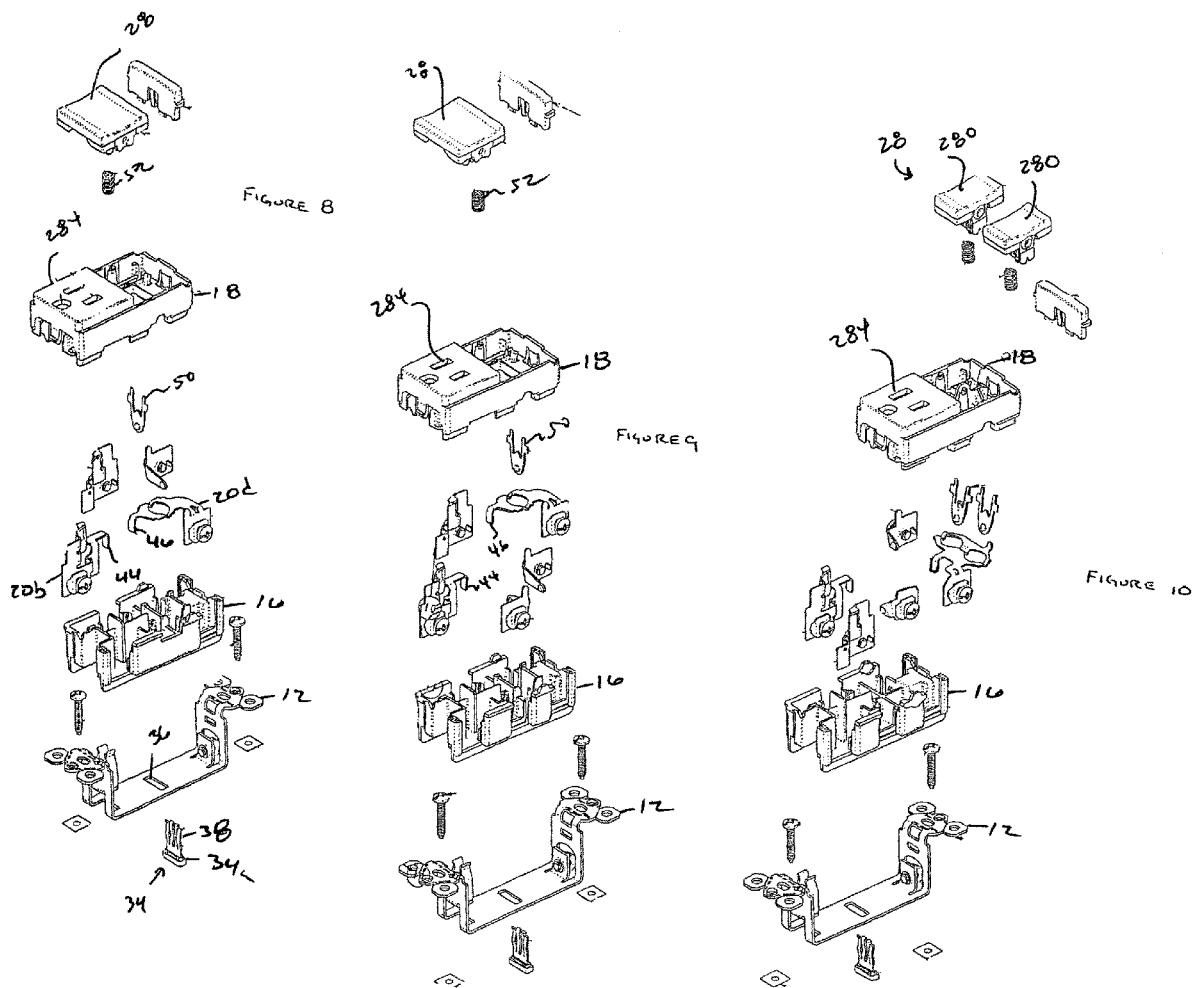

MODULAR ELECTRICAL DEVICE WITH CIRCUIT SPLITTING MEMBER

CROSS REFERENCE TO RELATED APPLICATIONS

This application claims the benefit of priority under 35 U.S.C. § 119(e) of Provisional U.S. Patent Application Ser. No. 60/439,370 filed on 9 Jan. 2003, the content of which is relied upon and incorporated herein by reference in its entirety.

FIELD OF THE INVENTION

The present invention relates to electrical wiring devices and more particularly to modular electrical wiring devices suitable for commercial and residential use.

BACKGROUND OF THE INVENTION

Electrical wiring devices, such as switches, receptacles, and sensor devices, are often provided in duplex or triplex configurations. For example, a duplex receptacle includes two sets of female contacts in each set. If the receptacle is a grounded receptacle, an electrical contact is provided for a ground terminal as well as line and neutral contacts. A duplex switch also includes two sets of switch contacts. A triplex device, obviously, includes three sets of contacts. Electrical wiring devices include wiring terminals for electrically coupling each electrical contact to a wire in the electrical circuit. In an ungrounded receptacle, the ground contact and corresponding ground terminal are eliminated.

Duplex or triplex electrical wiring devices such as switches and receptacles may have both a single and a split (or dual) circuit operating capability for operation in a single or a split (or dual) circuit configuration. In the following discussion duplex devices are discussed for ease of illustration. Those of ordinary skill in the art will understand that the discussion is applicable to triplex devices as well. In the split circuit mode each set of terminals (switch or receptacleterminals) receives electrical power from an independent circuit. On the other hand, in the single circuit mode, one circuit supplies power to both sets of terminals. The circuit that is coupled to a first set of terminals is fed through to the other set of terminals. Further, the same circuit may also provide power to additional downstream wiring devices. What is needed are wiring devices that may be configurable in the field as either single circuit or split circuit devices.

In one approach that has been considered, a slotted tab is disposed within an electrical wiring device that connects the first set of terminals with the second set of terminals. The wiring device may be converted from a single circuit device into a split circuit device by inserting a screwdriver blade into the wiring device to break off the tab. A pair of pliers may be used to perform this operation as well. Once the wiring device is configured as a split circuit device, each set of terminals are operated independently of each other. One drawback to this approach relates to the fact that once the device is in split circuit mode it cannot be reconfigured as a single circuit device. In other words, once the tab is broken, it cannot be re-installed. Thus, the device is scrapped or used elsewhere.

There are modular wiring devices that include a single frame and individual wiring devices such as receptacles or switches configurable to the frame. Each individual wiring device has a set of terminals. The sets of terminals are not disposed in the modular device to permit connection by a tab. Thus modular wiring devices are pre-assembled for a split circuit or single circuit configuration without ability to convert the device while in the field to the other circuit configuration.

What is needed is a wiring device that can be easily reconfigured as a single circuit device after it has been configured as a split circuit device, or vice-versa.

SUMMARY OF THE INVENTION

In one embodiment, the present invention includes an electrical wiring device. The electrical wiring device includes a device housing member including an opening and a first wiring device disposed in the housing, the first wiring device including a first terminal in communication with the opening. The electrical wiring device further includes at least one second wiring device disposed in the housing, the at least one second wiring device including a second terminal in communication with the opening and an insertable member or element configured to be inserted into the opening in a single circuit mode such that the insertable member or element establishes electrical connectivity between the first terminal and the second terminal. The insertable member or element is configured to be removed from the opening to break the electrical connectivity between the first terminal and the second terminal in a split circuit mode, the insertable member or element is configured to be re-inserted into the opening to reconfigure the device in single circuit mode.

The present invention for an electrical wiring device that incorporates an insertable member or element for splitting circuits is a labor saving device. Unlike previous electrical wiring devices that used "break off" tabs, the electrical wiring device of the present invention can readily be restored to a single circuit configuration if the circuits are mistakenly split.

The present invention for an electrical wiring device provides a universal method for connecting and disconnecting power-in lines for any combination of switches and/or receptacles contained within the same housing. Break off tabs do not allow this for all combinations, e.g., when electrical power is not adjacent in the device.

In another embodiment, the present invention includes an electrical wiring device. The electrical wiring device includes a device housing member including an opening and a first wiring device disposed in the housing, the first wiring device including a first terminal in communication with the opening. The electrical wiring device further includes at least one second wiring device disposed in the housing, the at least one second wiring device including a second terminal in communication with the opening and an insertable member or element configured to be inserted into the opening in a split circuit mode such that the insertable member or element breaks electrical connectivity between the first terminal and the second terminal. The insertable member or element is configured to be removed from the opening to establish electrical connectivity between the first terminal and the second terminal in a single circuit mode, the insertable member or element is configured to be re-inserted into the opening to reconfigure the device in split circuit mode.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1a is a perspective view of an one embodiment of the electrical device of the present invention;

FIG. 1b is a perspective view of the rear of the electrical device of FIG. 1a in which the insertable member or element is installed;

FIG. 1c is a perspective view of the rear of the electrical device of FIG. 1a showing the removal of the insertable member or element;

FIG. 2 is an exploded view of the electrical device shown in FIG. 1;

FIG. 3 is an exploded view of an alternative embodiment of the electrical device shown in FIG. 1;

FIG. 4 is an exploded view of an alternative embodiment of the electrical device shown in FIG. 1;

FIG. 5 is an exploded view of an alternative embodiment of the electrical device shown in FIG. 1;

FIG. 8 is an exploded view of an alternative embodiment of the electrical device shown in FIG. 1;

FIG. 9 is an exploded view of an alternative embodiment of the electrical device shown in FIG. 1;

FIG. 10 is an exploded view of an alternative embodiment of the electrical device shown in FIG. 1.

DETAILED DESCRIPTION OF THE PREFERRED EMBODIMENTS

Figure 6:
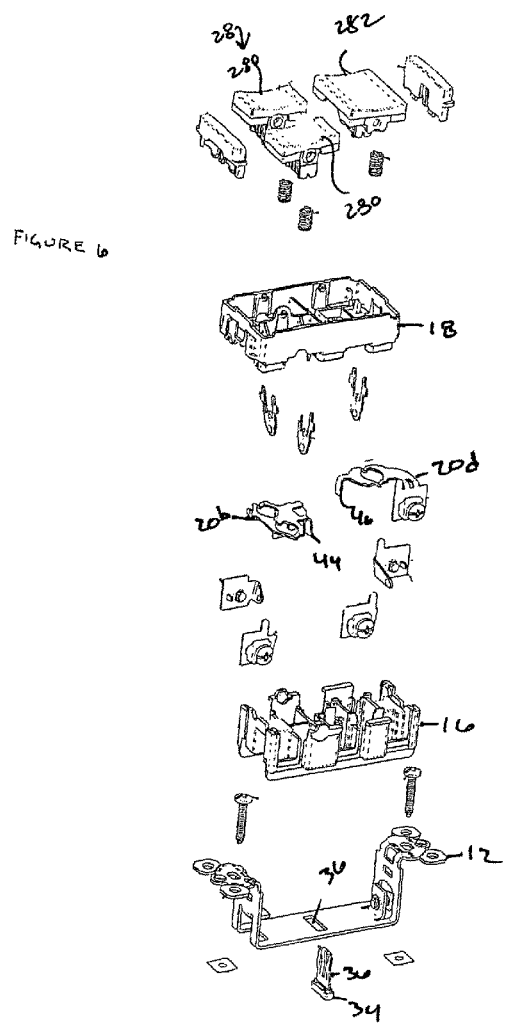
FIG. 6 is an exploded view of an alternative embodiment of the electrical device shown in FIG. 1.

Reference will now be made in detail to the present embodiments of the invention, examples of which are illustrated in the accompanying drawings. Whenever possible, the same reference numerals will be used throughout the drawings to refer to the same or like parts.

One embodiment of the electrical device of the present invention is shown in FIG. 1a and is designated generally throughout by the reference numeral 10. The electrical wiring device 10 includes a ground strap 12 and a housing 14. The housing 14 is configured for installation in an electrical wall box, and the ground strap 12 is configured to attach the electrical wiring device 10 to the wall box. Typically, screws are used to attach the ground strap 12 to the wall box. The housing 14 includes a body 16 and frame 18 and is configured to accept a first electrical wiring device 40 and second electrical wiring device 42. The first and second electrical wiring devices may be, for example, single pole switches, three way switches, dual single pole switch units, receptacles or any combination thereof.

Both the body 16 and the frame 18 are made from a non-electrically conductive material such as plastic, and may be made by injection molding. Those skilled in the art of making electrical wiring devices will readily appreciate that other manufacturing processes may be used. The body 16 and frame 18 are configured to engage one another to thereby form the housing 14. The body 16 is configured to receive a plurality of wiring terminals 20, the body 16 electrically isolates the wiring terminals from one another. The frame 18 may include a receptacle cover, multiple receptacles, or may be configured to receive at least one switch paddle. In the embodiment show in FIG. 1a, the frame 18 is configured to receive two switch paddles.

Turning to FIG. 1b, the rear of the modular electrical wiring device 10 of FIG. 1 is shown with the insertable member or element 34 in the installed position, hereafter termed element 34. When element 34 is in this position, the wiring device is configured in the single circuit mode. FIG. 1c also shows the rear of the electrical wiring device 10 but with the element 34 removed. When element 34 is removed, the wiring device 10 is in the split circuit mode.

In subsequent Figures, it will be seen that electrical wiring device 10 can include various types or quantities of wiring devices, each combination of wiring devices configurable into the single circuit mode by inserting element 34. Each combination may include components that can be included in other combinations.

Turning now to FIG. 2, which is an exploded view of FIG. 1, the operation of the present invention may be better understood. The electrical wiring device 10 shown in FIG. 2 includes two single pole switches 28.

The body 16 is configured to receive four wiring terminals 20a, 20b, 20c, 20d, the wiring terminals 20a, 20b, 20c, 20d are held apart from one another and are electrically isolated from one anther. Each of the 200c, 20d wiring terminals is configured to receive the end of an electrically conductive wire of the circuit (not shown). Each terminal 20a, 20b, 20c, 20d includes a wire contact surface 22 and a clamp 24 for securing the wire end to the terminal and thereby establish electrical conductivity between the wire and the terminal. Moveable switch contacts 50 are seated in apertures 200b and 200d, and are engaged by switch paddles 27 by way of springs 52.

It will be apparent to those skilled in the art of making electrical wiring devices that various modifications to the clamp 24 may be made without deviating from its function of establishing and maintaining electrical conductivity between a wire and the terminal. Therefore, the clamping mechanism shown should be considered as an example of one possible method and should not be considered limiting to the scope of the claimed invention.

The electrical wiring device 10 further includes a pair of removably engageable blanks 26. The use of a blank 26 at the end of the frame 18 adjacent to the switch paddle 27 provides a number of advantages. For example, the use of a blank 26 provides a predetermined spacing around the switch paddle 27 ensuring proper operation of the switch without requiring excessive care when installing the wall plate (not shown.) The blanks 26 operate to provide adequate spacing so as to prevent the switch paddle 27 from binding on the wall plate or other devices in a multi-gang application. Furthermore, the use of blanks 26 allow for maximum switch paddle 27 width as compared to a framed device by allowing the switch paddles 27 to be the same width as the opening in the wall plate. Each blank 26 includes a plurality of resilient members 30 that engage corresponding resilient members 32 of the frame 18.

As noted above, the electrical wiring device 10 further includes an element 34. The element 34 includes an electrically conductive jumper 38 and may include a non-condutive cap 34a. The element 34 removably extends through an opening 36 in the strap 12 and a corresponding opening in the body 16. The element 34 jumper 38 engages terminals 44, 46 extending from wiring terminals 20b, 20d respectively, thereby establishing electrical conductivity between the two wiring terminals 20b, 20d. With the wiring terminal 20b and wiring terminal 20d electrically coupled together by element 34, the electrical wiring device 10 is configured to operate in a single circuit mode.

When the element 34 is removed from the electrical device 10, the two wiring terminals 20b, 20d are electrically isolated from one another. In this configuration, the electrical wiring device 10 is configured to operate in a split circuit mode. Unlike conventional breakaway tab electrical wiring devices, the element 34 may be reinserted into the electrical wiring device 10 to thereby re-establish the original configuration, thus maintaining flexibility in the installation process.

In an alternative embodiment, as shown in FIG. 3, the electrical wiring device 10 of the present invention includes a three way switch 280 and a single pole switch 28. This embodiment is substantially similar to the embodiment shown in FIG. 2 except that the body 16 is configured to receive a fifth wiring terminal 20e.

In an alternative embodiment, as shown in FIG. 4, the electrical device 10 of the present invention includes two three way switches. This embodiment is substantially similar to the embodiment shown in FIG. 2 except that the body 16 is configured to receive six wiring terminals 20a, 20b, 20c, 20d, 20e, 20f.

In an alternative embodiment, as shown in FIG. 5, the electrical wiring device 10 of the present invention includes a dual single pole switch unit 282 and single pole switch 28. In this embodiment, which again is substantially similar to the embodiment shown in FIG. 1, one of the single pole switches is replaced by a dual single pole switch unit 282 which includes two single pole switches 28 each having a pivot 50, which pivots 50 share a common wiring terminal 20b. The element 34, when it is installed, engages the terminals 44, 46 of the two wiring terminals 20b, 20d. When the element 34 is installed, the electrical wiring device 10 is configured for operation in a single circuit mode where all three switches are on the same circuit. When the element 34 is removed, the dual single pole switch unit 282 and the single pole switch 28 are configured for multiple circuit operation where dual single pole switch unit 282 is on a first circuit, and the single pole switch 28 is on a second circuit.

In an alternative embodiment, as shown in FIG. 6, the electrical wiring device 10 of the present invention includes a dual single pole switch unit 282 and three way switch 280. The embodiment shown in FIG. 6 is substantially similar to that shown in FIG. 5, one notable exception is that the single pole switch 28 has been replaced by a three way switch 280. Thus the body 16 is configured to receive six terminals. The addition of the sixth terminal is readily accommodated by the modular electrical wiring device 10. The element 34, when it is installed, engages the tabs terminals 44, 46 of the two wiring terminals 20b, 20d. When the element 34 is installed, the electrical wiring device 10 is configured for operation in a single circuit mode where all three switches are on the same circuit. When the element 34 is removed, the dual single pole switch unit and the single pole switch are configured for multiple circuit operation.

Figure 7:
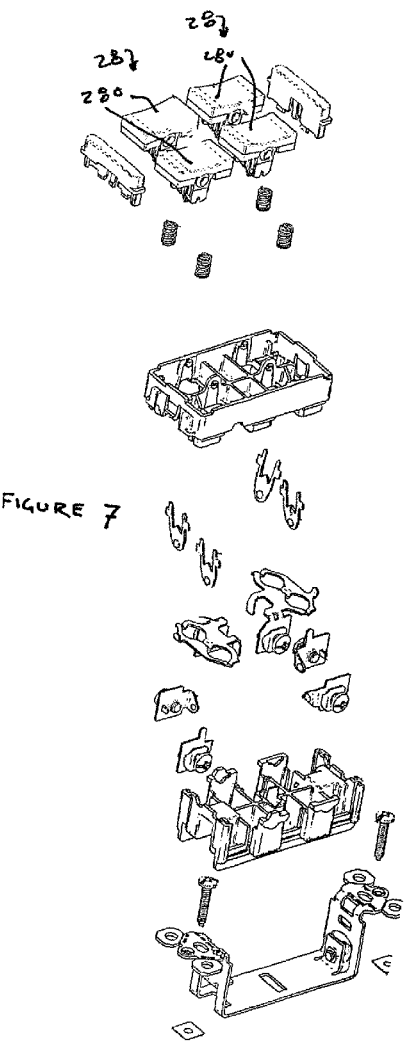
FIG. 7 is an exploded view of an alternative embodiment of the electrical device shown in FIG. 1.

In an alternative embodiment, as shown in FIG. 7, the electrical device 10 of the present invention includes two dual single pole switch units 282. The embodiment shown in FIG. 7 is substantially similar to that shown in FIG. 5, one notable exception is that the single pole switch 28 has been replaced by a dual single pole switch unit 282. Thus, the body 16 is configured to receive six terminals. The element 34, when it is installed, engages the terminals 44, 46 of the two wiring terminals 20b, 20d. When the element 34 is installed, the electrical wiring device 10 is configured for operation in a single circuit mode where all three switches are on the same circuit. When the element 34 is removed, the dual single pole switch units are configured for multiple circuit operation.

In an alternative embodiment, as shown in FIG. 8, the electrical device 10 of the present invention includes a single pole switch 28 and a receptacle 284. The embodiment shown in FIG. 8 is substantially similar to that shown in FIG. 2, one notable exception is that one of the single pole switches has been replaced by a receptacle 284. The body 16 is still configured to receive four terminals, however the pivot and stationary terminals of one of the single pole switches are replaced by terminals configured to engage an electrical plug. The element 34, when it is installed, engages the terminals 44 of wiring terminal 20b and terminal 46 of wiring terminal 20d. When the element 34 is installed the electrical wiring device 10 is configured for operation in a single circuit mode where the switch and the receptacle are on the same circuit. When the element 34 is removed, the receptacle and the single pole switch are configured for split circuit operation.

In an alternative embodiment, as shown in FIG. 9, the electrical device 10 of the present invention includes a three way switch 280 and a receptacle 284. The embodiment shown in FIG. 9 is substantially similar to that shown in FIG. 8, one notable exception is that the single pole switch is replaced by a three way switch 280. The body 16 is configured to receive five terminals. The element 34, when it is installed, engages the terminals 44 of contact 20b and terminal 46 of terminal 20d. When the element 34 is installed, the electrical wiring device 10 is configured for operation in a single circuit mode where the switch and the receptacle are on the same circuit. When the element 34 is removed, the receptacle and the three way switch are configured for multiple circuit operation.

In an alternative embodiment, as shown in FIG. 10, the electrical device 10 of the present invention includes a dual single pole switch unit 282 and a receptacle 284. The embodiment shown in FIG. 10 is substantially similar to that shown in FIG. 8, one notable exception is that the single pole switch is replaced by a dual single pole switch unit 282. The body 16 is configured to receive five wiring terminals. The element 34, when it is installed, engages the terminals 44 of wiring terminal 20b and terminal 46 of wiring terminal 20d. When the element 34 is installed, the electrical wiring device 10 is configured for operation in a single circuit mode where the dual single pole switch unit 282 and the receptacle 284 are on the same circuit. When the element 34 is removed, the receptacle and the two switches of the dual single pole switch unit are configured for multiple, or split circuit operation.

Figure 11A:
FIGS. 11A–11C show alternate embodiments of the insertable element.

As embodied herein and depicted in FIG. 11A, insertable element 34 as shown in FIG. 1a–FIG. 1c is depicted. Element 34 includes a head 340 made from an insulator material. Head 340 is connected to conductive member 342, which designed to mate with blades 44 and 46 (See FIG. 2).

Figure 11B:
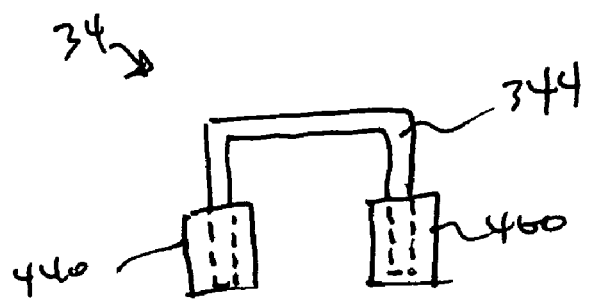

In FIG. 11B, insertable member 34 is configured as a staple-like member. It includes legs 344 which are configured to be inserted into female receptacles 440 and 460, which replace blades 44 and 46, respectively.

Figure 11C:
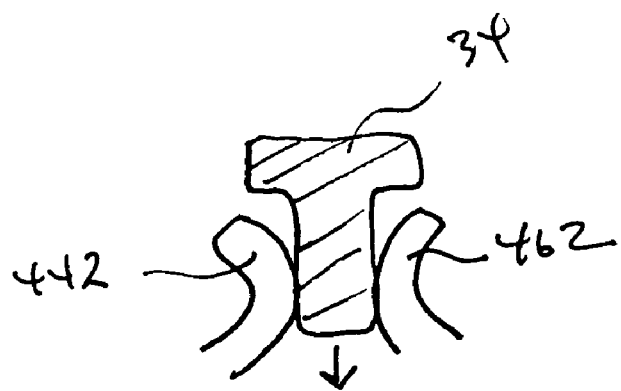

In FIG. 11C, element 34 is a non-conductive member. Terminals 442 and 462 are configured to establish electrical connectivity between wiring terminals 20b and 20d when element 34 is not inserted into opening 36. When element 34 is inserted, electrical connectivity between terminals 44 and 46 is broken, resulting in electrical isolation between terminals 20b and 20d. Thus, element 34 is inserted for the split circuit configuration and removed for the single circuit configuration.

It will be apparent to those skilled in the art that other desirable alternative embodiments of the present invention are readily constructed from the teachings contained herein, for example other alternative embodiments may include ground fault interruption protection.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A modular electrical wiring device, comprising:
   a housing member including an opening;
   a first wiring device disposed in the housing, the first wiring device including a first element in communication with the opening;
   at least one second wiring device disposed in the housing, the at least one second wiring device including a second element in communication with the opening; and
   an insertable member or element configured to be inserted into the opening in a single circuit mode such that the insertable tab establishes electrical connectivity between the first element and the second element, the insertable member or element being configured to be removed from the opening to break electrical connectivity between the first element and the second element in a split circuit mode, the insertable member or element being configured to be re-inserted into the opening to reconfigure the device in single circuit mode.

2. The electrical wiring device of claim 1 wherein the first wiring device includes a single pole switch.

3. The electrical wiring device of claim 2 wherein the second wiring device includes a single pole switch.

4. The electrical wiring device of claim 2 wherein the second wiring device includes a three way switch.

5. The electrical wiring device of claim 2 wherein the second wiring device includes a dual single pole switch unit.

6. The electrical wiring device of claim 2 wherein the second wiring device includes a receptacle, the second element being integral with a receptacle contact.

7. The electrical wiring device of claim 2 wherein the second wiring device includes a ground fault circuit interrupter.

8. The electrical wiring device of claim 1 wherein the first wiring device includes a three way switch.

9. The electrical wiring device of claim 8 wherein the second wiring device includes a dual single pole switch unit.

10. The electrical wiring device of claim 8 wherein the second wiring device includes a receptacle, the second element being integral with a receptacle contact.

11. The electrical wiring device of claim 8 wherein the second wiring device includes a ground fault circuit interrupter.

12. The electrical wiring device of claim 8 wherein the second wiring device includes a three way switch.

13. The electrical wiring device of claim 1 wherein the first wiring device includes a dual single pole switch unit.

14. The electrical wiring device of claim 13 wherein the second wiring device includes a dual single pole switch unit.

15. The electrical wiring device of claim 13 wherein the second wiring device includes a receptacle, the second element being integral with a receptacle contact.

16. The electrical wiring device of claim 13 wherein the second wiring device includes a ground fault circuit interrupter.

17. The electrical wiring device of claim 1 wherein the first wiring device includes a receptacle, the first element being integral with a receptacle contact.

18. The electrical wiring device of claim 17 wherein the second wiring device includes a receptacle, the second element being integral with a receptacle contact.

19. The electrical wiring device of claim 18 wherein the second wiring device includes a ground fault circuit interrupter, the second element being integral with a receptacle contact.

20. The electrical wiring device of claim 1 wherein the insertable member or element includes a conductive jumper.

21. The electrical wiring device of claim 1 wherein the insertable member or element includes a non-conductive cap.

22. A modular electrical wiring device, comprising:
   a housing member including an opening;
   a first wiring device disposed in the housing, the first wiring device including a first element in communication with the opening;
   at least one second wiring device disposed in the housing, the at least one second wiring device including a second element in communication with the opening; and
   an insertable element configured to be inserted into the opening in a split circuit mode such that the insertable tab breaks electrical connectivity between the first element and the second element, the insertable member or element being configured to be removed from the opening to establish electrical connectivity between the first element and the second element in a single circuit mode, the insertable element being configured to be re-inserted into the opening to reconfigure the device in split circuit mode.

23. The electrical wiring device of claim 22 wherein the first wiring device includes a single pole switch.

24. The electrical wiring device of claim 23 wherein the second wiring device includes a single pole switch.

25. The electrical wiring device of claim 23 wherein the second wiring device includes a three way switch.

26. The electrical wiring device of claim 23 wherein the second wiring device includes a dual single pole switch unit.

27. The electrical wiring device of claim 23 wherein the second wiring device includes a receptacle, the second element being integral with a receptacle contact.

28. The electrical wiring device of claim 23 wherein the second wiring device includes a ground fault circuit interrupter.

29. The electrical wiring device of claim 22 wherein the first wiring device includes a three way switch.

30. The electrical wiring device of claim 29 wherein the second wiring device includes a dual single pole switch unit.

31. The electrical wiring device of claim 29 wherein the second wiring device includes a receptacle, the second element being integral with a receptacle contact.

32. The electrical wiring device of claim 29 wherein the second wiring device includes a ground fault circuit interrupter.

33. The electrical wiring device of claim 29 wherein the second wiring device includes a three way switch.

34. The electrical wiring device of claim 22 wherein the first wiring device includes a dual single pole switch unit.

35. The electrical wiring device of claim 34 wherein the second wiring device includes a dual single pole switch unit.

36. The electrical wiring device of claim 34 wherein the second wiring device includes a receptacle, the second element being integral with a receptacle contact.

37. The electrical wiring device of claim 34 wherein the second wiring device includes a ground fault circuit interrupter.

38. The electrical wiring device of claim 22 wherein the first wiring device includes a receptacle, the first element being integral with a receptacle contact.

39. The electrical wiring device of claim 38 wherein the second wiring device includes a receptacle, the second element being integral with a receptacle contact.

40. The electrical wiring device of claim 39 wherein the second wiring device includes a ground fault circuit interrupter, the second element being integral with a receptacle contact.

41. The electrical wiring device of claim 22 wherein the insertable member or element is electrically non-conductive.

* * * * *

UNITED STATES PATENT AND TRADEMARK OFFICE
CERTIFICATE OF CORRECTION

| | | |
|---|---|---|
| PATENT NO. | : 7,041,902 B1 | Page 1 of 1 |
| APPLICATION NO. | : 10/729566 | |
| DATED | : May 9, 2006 | |
| INVENTOR(S) | : Gerald R. Savicki, Dejan Radosavljevic and Kenneth Vought | |

It is certified that error appears in the above-identified patent and that said Letters Patent is hereby corrected as shown below:

(73) Assignee: Pass & Seymour, Inc., Sgracuse, NY (US)

should be

(73) Assignee: Pass & Seymour, Inc., Syracuse, NY (US)

Signed and Sealed this

Twenty-second Day of August, 2006

JON W. DUDAS
*Director of the United States Patent and Trademark Office*